United States Patent Office 3,109,173
Patented Oct. 29, 1963

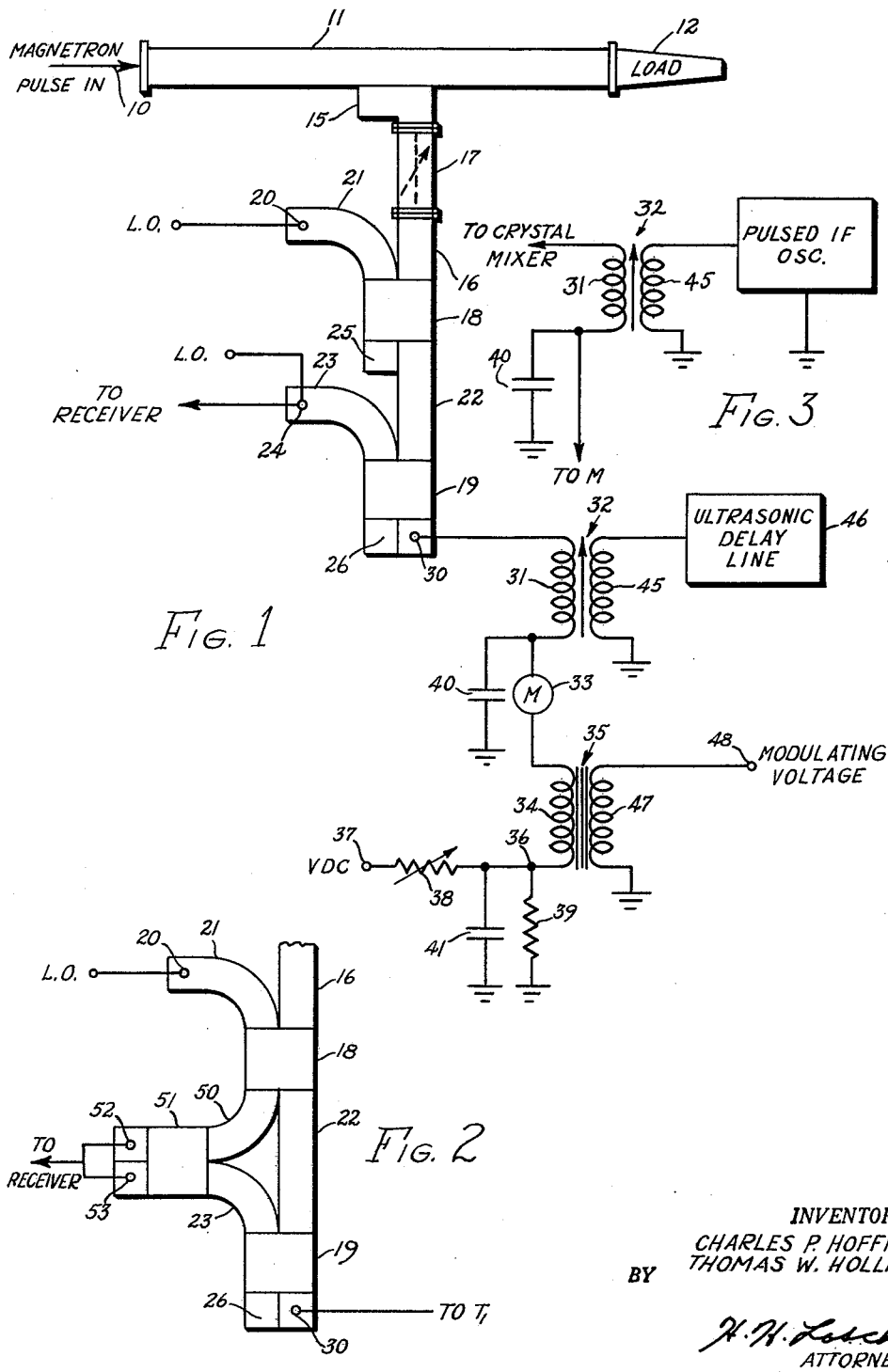
Oct. 29, 1963  C. P. HOFFMAN ET AL  3,109,173
BUILT-IN MODULATION MEANS IN SIMULATED RADAR RANGE TEST CIRCUIT
Filed June 11, 1959
INVENTOR.
CHARLES P. HOFFMAN
THOMAS W. HOLLIS, JR.
BY
ATTORNEYS

3,109,173
BUILT-IN MODULATION MEANS IN SIMULATED RADAR RANGE TEST CIRCUIT
Charles P. Hoffman and Thomas W. Hollis, Jr., Baltimore, Md., assignors, by mesne assignments, to the United States of America as represented by the Secretary of the Navy
Filed June 11, 1959, Ser. No. 819,793
7 Claims. (Cl. 343—17.7)

This invention relates to radar systems and primarily to radar ranging systems of the pulse echo type and more particularly to a built-in system of simulating radar range signals and of modulating these simulated signals to simulate moving target objects for the purpose of testing the efficiency and the tracking and ranging circuits of a radar ranging system under operative conditions.

In the past many methods have been used in testing the efficiency of the radar tracking and ranging circuits. These, in general and for the most part, have been by way of using testing equipment such as echo boxes which may be changed in range for testing radar ranging equipment in a test or maintenance area. Such test equipment is usually and ordinarily found as separate equipment (portable or fixed) in a maintenance area which could be used by attachment to, or in operative relation with, any system brought into the maintenance area for testing. This test equipment may include test leads which could be attached at various points in the electrical circuits of radar ranging equipment to apply predetermined voltages to the radar ranging system to test the accuracy of the radar ranging or the tracking circuits thereof. Such test equipment often requires complicated tube circuits to generate the various voltages some of which voltages must be variable to simulate tracking voltages. Where test circuits have been built into radar ranging systems to produce test of radar efficiency in actual operation of the radar system, such circuits are tube circuits which require considerable space and are of considerable weight. Where the radar ranging system is used in vehicles such as aircraft and space is at a premium and weight must be held to an absolute minimum, such built-in test systems are a great disadvantage by their cumbersomeness.

In the present invention a small amount of additional equipment may be added to the conventional aircraft radar ranging system to provide a built-in test circuit capable of testing the efficiency of the target tracking circuits and the ranging circuits during the flight operation of the radar ranging system. In this invention simulated target object signals are provided from samples of radar energy taken from the radar ranging system and additional means are provided to modulate the simulated radar ranging signals providing a simulated moving target. These means providing for the simulated moving target require no tube circuits which would further require occasional tests of the efficiency thereof. In this invention a sample waveguide channel is coupled to a waveguide coupling a transmitter magnetron to a load and the sample energy therefrom controlled by an attenuator prior to the mixing of this energy with local oscillations in a crystal mixer. The crystal mixer is coupled through a transformer to an ultrasonic quartz delay line for reflecting intermediate frequency (IF) simulated target signals back to the mixer for conduction to the receiver circuit. A modulating voltage is applied through a transformer coupling in common with the transformer coupling between the mixer and ultrasonic delay line to modulate the IF signals simulating the target object signals thereby producing simulated moving target object signals. The crystal mixer, by this means, may be adjustably biased by as little as one volt and the modulating voltage may be of one-half volt or less. The use of the ultrasonic delay line and of the modulating means providing linear modulation of low level radio frequency (RF) in combination with the crystal mixer of the radar ranging system provides a means of testing radar ranging equipment closely simulating the radar ranging equation for checking radar efficiency. By this system a programmed simulated signal means may be produced in a radar ranging system simulating an actual moving target object in space which can be used to check the radar tracking circuits and the range circuits in efficiency. It is, therefore, a general object of this invention to provide a radar ranging system of the pulse echo type for producing simulated target object information simulating a moving target object whereby the tracking circuits and the range circuits of the radar ranging system can be tested and calibrated during periods of operation of the system.

These and other objects, advantages, features and uses may become more apparent to those skilled in the art when considered along with the accompanying drawing, in which:

FIGURE 1 illustrates a schematic block and circuit diagram of the built-in target simulating and modulating test circuits in combination with a transmitter input and load circuit of a radar ranging system, FIGURE 2 shows a modification of the local oscillator circuit of the sample waveguide, and FIGURE 3 illustrates modification of the ultrasonic delay line shown in FIGURE 1.

Referring more particularly to FIGURE 1 there is shown a magnetron pulse input 10 coupled through a waveguide 11 to a load 12 which may be a dummy or absorbent load. This radar ranging system has the conventional transmitting and receiving channel which is not shown herein since all of the radar ranging system is not needed to set forth the features of this invention. It is well understood in the art that in a radar ranging system pulsed radar energy is produced by a magnetron and conducted over a waveguide and transmitted into space by an antenna as radiant energy, which radiant energy, if reflected by a target object in space, will be picked up by radar antenna means and conducted to a receiver calibrated in time to measure the range of the reflecting target object. If the target object is moving, the time period existing between each transmitted pulse and its reflected pulse will change from which information the speed, direction, and range of the moving target object can be calibrated in the radar ranging system. Since the radar ranging system incorporates many electronic elements and tube circuits which, through natural causes, may drift to introduce error into the range and range rate calibration, it becomes necessay occasionally to check the radar ranging system for accuracy and efficiency.

In the present invention a sample of the transmitted magnetron energy is taken from the waveguide 11 of the radar ranging system by means of a coupler 15, the remainder going to load 2. The coupler 15 couples a sample waveguide channel 16 in which there is an adjustable attenuator 17 for adjusting the amplitude of the sampled magnetron energy transmitted to the waveguide channel 16. In the sample waveguide channel 16 are two junctions 18 and 19 of the type known as three decibel, or three db, hybrid junctions. The first hybrid junction 18 couples a local oscillator through a crystal input 20 to a waveguide arm 21 connected into the hybrid junction 18. The hybrid junction 18 is connected to the hybrid junction 19 through a waveguide 22 and the hybrid junction 19 has an output waveguide arm 23 which may have a crystal output 24 to a receiver. The crystal output 24 may have a separate local oscillator coupled thereto or the same local oscillator coupled to the crystal 20 also coupled to the crystal 24, if properly isolated.

The three db hybrid junctions 18 and 19 each have load absorbent cavities 25 and 26, respectively, as is well understood of these hybrid junctions by those skilled in the art, to absorb half of the energy from each input whereby the other half of the energy is conducted through the waveguide 22 from the junction 18 to junction 19.

A crystal mixer 30 in a portion of the hybrid junction 19 adjacent to the absorbent load cavity 26 is of a two-way crystal type for mixing the frequencies of the sampled magnetron energy and of the local oscillator to produce an output IF signal and at the same time to introduce IF signals back into the system to cause remixing with the IF produced by mixing the original magnetron energy and local oscillator frequencies. The crystal mixer 30 is coupled through one winding 31 of a transformer 32 and through a monitor 33, such as an ammeter or the like, and through a secondary winding 34 of a transformer 35 to a crystal bias voltage established at a terminal point 36. This crystal bias voltage is established by the application of a direct current voltage at a terminal 37 through a variable resistance 38 which voltage is divided by the resistance 39 coupled between terminal 36 and ground. The junction of the winding 31 and the monitor 33 is coupled to ground through a capacitor 40 and the terminal point 36 is coupled to ground through a capacitor 41, the purpose of each capacitor of which will be more fully explained hereinbelow. The other winding 45 of the transformer 32 is coupled to an ultrasonic quartz delay line 46 whereby IF signals coming from the mixer 30 are applied to the ultrasonic delay line 46 and reflected back through the transformer 32 to the mixer as delayed and attenuated IF pulses. The primary winding 47 of the transformer 35 has a modulating voltage applied thereto at the terminal 48 which modulating voltage is applied through the transformer 35 and to the winding 31 of transformer 32 to modulate the delayed IF signals from the ultrasonic quartz line 46. The bias on the crystal mixer 30 is adjustable by the variable resistance 38. The D.C. bias on the crystal mixer 30 is adjusted so that the mixer output drops approximately six db from the peak mixing level. When mixer 30 is operated at this point and modulating voltage is applied from the source 48, substantially 100% modulation is possible although the modulating voltage applied is half a volt or less. The capacitors 40 and 41 are used to bypass the IF and modulating frequency, respectively. The monitor 33, which may take the form of an ammeter or other current indicating means, may be used to indicate the crystal current of the crystal mixer 30.

As shown in FIGURE 2, where it is not desirable to apply oscillations from a separate local oscillator or from the local oscillator applying oscillations to the crystal input 20, oscillations from the local oscillator coupled to the crystal 20 in the arm 21 may be applied through an arm 50 to a third hybrid junction 51 coupling the output arm 23 from the hybrid junction 19. The output to the receiver can then be taken from two crystals 52 and 53 coupled in common at the hybrid junction 51. By this means delayed simulated IF signals reflected back from the ultrasonic quartz line 46 to the crystal mixer 30 will return to the original magnetron frequency and be mixed with oscillations from the local oscillator frequency applied to the crystal input 20 coming by way of the junction 18, arm 50, and the junction 51 to produce IF signals on the crystal output 52 and 53 to the receiver.

In FIGURE 1, where the absorbent cavity 26 of the three db hybrid junction 19 is made slightly reflective so that the half of the local oscillator energy applied to 26 is partially reflected back to mix with the delayed IF signals applied back into the crystal mixer 30, the oscillations applied by the local oscillator to the crystal 24 in the outlet waveguide arm 23 may be eliminated. In like manner the necessity for supplying oscillations from a local oscillator in the manner as shown in FIGURE 2 could be eliminated where the portion 26 of the three db hybrid junction 19 is made slightly reflective. The illustration of applying local oscillations to the crystal input 24 in the output arm 23 of FIGURE 1, or by way of the arm 50 and the hybrid junction 51 in FIGURE 2, are illustrated for convenience where oscillations from a local oscillator reflected in the hybrid junction 19 is not always convenient or readily developed. Any modulated delayed IF signals simulating moving target signals reflected back to the crystal mixer 30 will therefore have signal means for mixing therewith to condition these simulated target object signals for the receiver channel.

While the ultrasonic quartz delay line 46 has been found quite suitable for generating delayed IF signals simulating a target object which simulated target signals are predetermined in time delay for calibrating the radar ranging system in accordance with a time constant of the preselected ultrasonic delay line, such a quartz crystal line could have substituted therefor a pulsed IF oscillator such as illustrated in FIGURE 3. The pulsed IF oscillator will have the disadvantage of vacuum tubes therein not found in ultrasonic delay line 46; however, there may be conditions under which a pulsed IF oscillator may be desired over an ultrasonic quartz line since the pulsed IF oscillator could be varied in frequency under certain conditions of use.

In the operation of the device let it be assumed that the radar ranging system is in operation and switched through a microwave switch (not shown) from the transmit-receive mode to the test mode in which the magnetron is developing pulse energy which is conducted through the waveguide 11 to the load 12. A sample of this magnetron energy is conducted through the coupler 15 into the sample waveguide 16 through the attenuator 17. The sample energy is divided at the three db hybrid junction 18, half of which is conducted into the waveguide 22 and half of which is absorbed in the absorbent cavity 25. Local oscillations conducted into the hybrid junction 18 by way of the waveguide arm 21 from the crystal 20 is divided half into the waveguide 22 and half absorbed by the absorbent cavity 25. The sampled energy coming by way of waveguide 22 into the three db hybrid junction 19 is divided half to the crystal mixer 30 and half to the absorbent cavity 26. The half of the magnetron sampled energy and the half of the energy from the local oscillator coupled at 20 coming by way of the waveguide 22 are mixed in the crystal mixer 30 to produce IF signals that are conducted by transformer 32 to the ultrasonic quartz delay line 46. This IF is delayed and attenuated in the ultrasonic quartz delay line 46 and reflected back through the transformer 32 to the crystal mixer 30. A modulating voltage applied to the terminal 48 and through the transformer 35 is applied through the winding 31 of transformer 32 thereby modulating the reflected, delayed and attenuated IF signals coming from the ultrasonic quartz delay line 46 to the crystal mixer 30. The modulated delayed and attenuated IF signals applied to the crystal mixer 30 provide simulated IF signals simulating a moving target object of predetermined delay time fixing a predetermined instantaneous range and of preselected modulation fixing the predetermined target object speed of a simulated target. The modulated delayed and attenuated IF signals applied to the crystal mixer 30 return back into the original magnetron frequency but of predetermined delay and rate of change which signals are mixed at the crystal 24 with local oscillator frequency to produce frequency applicable to the receiver. The receiver (not shown) which ordinarily has an A-scope or a PPI scope type indicator will indicate the range of the simulated target and the speed and direction of travel which should correspond with precalculated calibrations thereon to check the efficiency and accuracy of the tracking and range circuits. In order to change the intensity of the simulated target object signals, the attenuator 17 may be adjusted to adjust the amplitude of the magnetron energy to simulate differences in target size. The amplitude of these simulated targets may be increased or decreased without affecting the decay rate of the simulated signals. Thus it would be possible to calibrate a system for a certain size target and for return pulses spaced at intervals to simulate a target in range. By modulating these targets many system parameters such as the tracking circuits, target size, and target range, can be checked for different targets.

The operation of FIGURE 1 would remain substantially the same even though this figure be modified in the manner shown by FIGURE 2 or further modified as shown by the illustration in FIGURE 3. The sampling waveguide 16, 22 could be coupled as by 15 to any radar ranging waveguide system utilizing an absorbent load channel as 11 with the combination of the ultrasonic delay line and modulating means thereon to provide a built-in system that is readily adapted to check the efficiency and accuracy of the radar ranging system. Where convenient or desirable, switching means may be used between the receiver and the sample waveguide channel as well as the ultrasonic delay line and the modulating means to switch the radar ranging system to a test condition or to a radar ranging condition. By such a means of switching a radar ranging system could be switched to check the efficiency and accuracy of the system for a few seconds during any operating period even though the radar ranging system be airborne. Although the test circuit shown and described herein is for a built-in radar system, it is to be understood that it could be used in auxiliary test equipment. It is also to be understood that this test system is readily adaptable for pulse type moving target indicator radar systems as well as the conventional radar ranging systems.

While many modifications and changes may be made in the constructional details and features of this invention it is to be understood that we desire to be limited only by the scope of the appended claims.

We claim:

1. A means of linear modulation of low level radio frequency in a radar ranging system having a waveguide channel coupling a magnetron to a load with a waveguide coupling a sampling waveguide channel to the first-mentioned waveguide channel, the sampling waveguide having a junction for inserting oscillations from a local oscillator and a junction to conduct energy to a receiver channel, the invention which comprises: a crystal mixer adjacent to the receiver junction for mixing sampled magnetron energy and oscillations from said local oscillator into intermediate frequency; inductive means coupling said crystal mixer to couple said intermediate frequency with a means for producing delay oscillations of intermediate frequency; modulating means coupled to said inductive coupling means for modulating said delay oscillations of intermediate frequency, said modulated delay oscillations being returned to said crystal mixer for being mixed with said intermediate frequency returning said intermediate frequency and delayed intermediate frequency to a delayed magnetron energy, said delayed magnetron energy being applied through said receiver junction to said receiver channel whereby radar range signals simulating the range of a moving target object is produced for testing the radar ranging system.

2. A means of linear modulation of low level radio frequency as set forth in claim 1 wherein said inductive means is a transformer, the crystal mixer being coupled through one winding thereof and the means for producing delay oscillations being coupled through the other winding thereof, and said modulating means is coupled to said one winding of said transformer.

3. A means providing radar range test signals simulating movable target objects in a radar ranging system comprising: a radar ranging system having a waveguide connecting a transmitter to a load; a sampling waveguide coupled to said waveguide for receiving samples of the transmitted energy; an attenuator, a local oscillator junction, and a receiver junction, in that order from said waveguide, in said sampling waveguide; a crystal mixer adjacent to said receiver junction for mixing samples of said transmitted energy with oscillations applied through said local oscillator junction to produce intermediate frequency; an ultrasonic delay line; means inductively coupling said ultrasonic delay line and said crystal mixer for receiving said intermediate frequency and returning delayed intermediate frequency signals to said crystal mixer, said delayed intermediate frequency signals being mixed with said intermediate frequency returning said intermediate frequency and delayed intermediate frequency to a delayed transmitter energy, and said delayed transmitter energy being mixed with oscillations of local oscillator means and applied through receiver junction to a receiver channel; and a modulating means coupled to said means inductively coupling said ultrasonic delay line with said crystal mixer for modulating said delayed intermediate frequency signals whereby test radar range signals simulating a movable target object are produced for application to the receiver channel.

4. A means providing radar range test signals as set forth in claim 3 wherein said means inductively coupling said ultrasonic delay line and said crystal mixer is a first transformer having one winding coupled to said crystal mixer and through a secondary winding of a second transformer to a preselected potential, the other winding of said first transformer being coupled to said ultrasonic delay line, and said modulating means is coupled through a primary winding of said second transformer.

5. A means providing radar range test signals as set forth in claim 4 wherein said preselected potential is an adjustable bias potential for biasing the crystal of said crystal mixer.

6. A means of linear modulation of low level radio frequency signals to provide test signals simulating a movable target object in a radar ranging system having a waveguide connecting a transmitter magnetron to a load, the invention which comprises: a sampling waveguide channel coupled to said system waveguide for receiving samples of the magnetron energy radio frequency signals, said sampling waveguide channel having an attenuator therein for attenuating the radio frequency signals and having two hybrid couplers, one hybrid coupler being downstream from said attenuator and coupled through one arm to a local oscillator, and the other hybrid coupler being downstream from said one hybrid coupler and coupled through one arm to a receiver output; a crystal mixer in said sample waveguide channel downstream from said other hybrid coupler for mixing the signals from the local oscillator with the radio frequency signals to produce intermediate frequency signals, said crystal mixer being coupled through one winding of a first transformer, a monitor, and the secondary of a second transformer to a crystal biasing potential; an ultrasonic delay line coupled through the other winding of said first transformer for receiving said intermediate frequency signals and reflecting back delayed intermediate frequency signals to said crystal mixer to reproduce said radio frequency signals but delayed in time from the above-mentioned radio frequency signals, said delayed radio frequency signals being conducted to said receiver output; and a modulating voltage coupled to the primary winding of said second transformer for modulating said delayed intermediate frequency signals reflected back to said crystal mixer by said ultrasonic delay line, said one winding of the first transformer and the secondary of said second transformer each being coupled to a fixed potential through a capacitor to bypass intermediate frequency and modulating voltages, respectively, whereby said delayed radio frequency signals are conducted over the receiver output simulating range of a moving target object, the intensity of these signals being adjustable by said attenuator.

7. A means of linear modulation of low level radio frequency signals as set forth in claim 6 wherein said crystal biasing potential is adjustable, said monitor is a current meter, and said ultrasonic delay line is quartz.

References Cited in the file of this patent
UNITED STATES PATENTS

| | | |
|---|---|---|
| 2,454,219 | Schultz et al. | Nov. 16, 1948 |
| 2,857,593 | Schwab | Oct. 21, 1958 |
| 2,872,673 | Pleasure | Feb. 3, 1959 |
| 3,024,461 | Hollis | Mar. 6, 1962 |

OTHER REFERENCES

Rosenberg et al.: A Radar Test Set for the Super-High-Frequency Band; Proceedings of the Institute of Electrical Engineers, vol. 96, part III, No. 44, November 1949, pp. 476–482.

Sinish: Precision Calibrator Checks Radar Beacons; Electronics, vol. 28, No. 4, April 1955, pp. 150–153.

Boulding: "Radar Pocket Book," published 1955 D. Van Nostrand Company, Inc., N.Y., p. 56.